Feb. 4, 1964 H. F. RAMBAT 3,120,292
VEHICLE WHEEL CHOCK
Filed March 22, 1962

Harry F. Rambat
INVENTOR.

BY

United States Patent Office 3,120,292
Patented Feb. 4, 1964

3,120,292
VEHICLE WHEEL CHOCK
Harry F. Rambat, Bird City, Kans.
Filed Mar. 22, 1962, Ser. No. 181,659
2 Claims. (Cl. 188—32)

This invention relates to a portable wheel chock which is capable of being readily placed in position for use and thereafter readily removed and stored in a vehicle trunk or elsewhere until again needed for use.

Briefly, the invention comprises a pair of opposed coplanar abutments having inwardly disposed sloping surfaces designed and adapted to bear against circumferentially spaced portions of the peripheral tread of a wheel which is to be chocked and retained in a given position, connecting means rigidly joining corresponding end portions of said abutments to each other, and handle means carried by said connecting means.

Stated somewhat more specifically the aforementioned connecting means is interposed between the respective end portions of the abutments cooperating therewith and is characterized by a rigid member, an angle iron, for example, having vertical and horizontal flanges affixed to adjacent portions of the abutments. The handle means has an end thereof which is hingedly joined to the median portion of the rigid member. In addition the handle means is made up of telescoping members and is extensible and contractible, the members being such that they serve to provide a simple manually actuatable impact or driving member which functions to hammer the abutments into a position of use.

The invention is such in construction and purpose that it lends itself to practical use at such time that the user desires to jack up a wheel of the automobile or vehicle preparatory to changing a tire. Likewise the invention functions satisfactorily and reliably for blocking a wheel (or wheels) of a trailer house which has been parked on a trailer camping site.

In carrying out the desired aspects of the concept the abutments are preferably of elongated inverted V-shaped form, the walls or flanges thereof having lower edges which serve as runners and which may be readily slid into position or out of position in a time and labor-saving manner.

Novelty is also predicated on the handle characterized by telescoping components which when collapsed shortens the handle for compactness and convenience and which cooperate in providing a simple hammer, that is a self-contained hammer or which, if preferred, may be driven with the aid of a mallet or any other implement which might be handy for such purposes.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
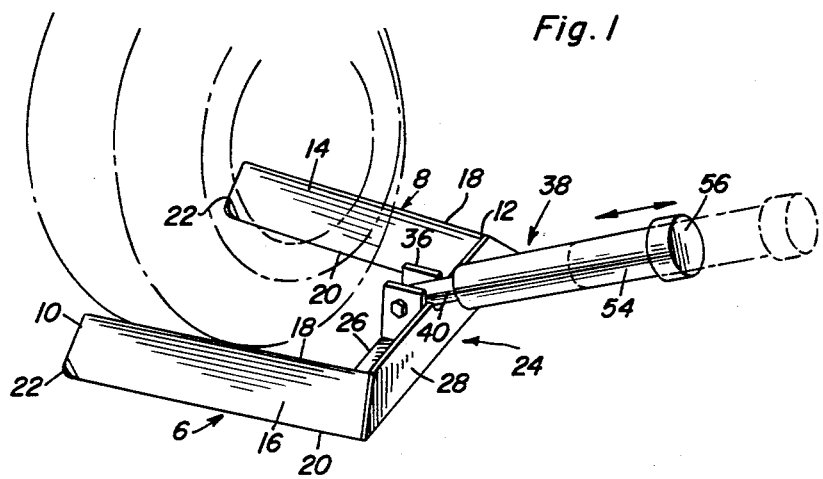
FIGURE 1 is a view in perspective showing the improved wheel chock and how it is constructed and intended to be used.
Figure 2:
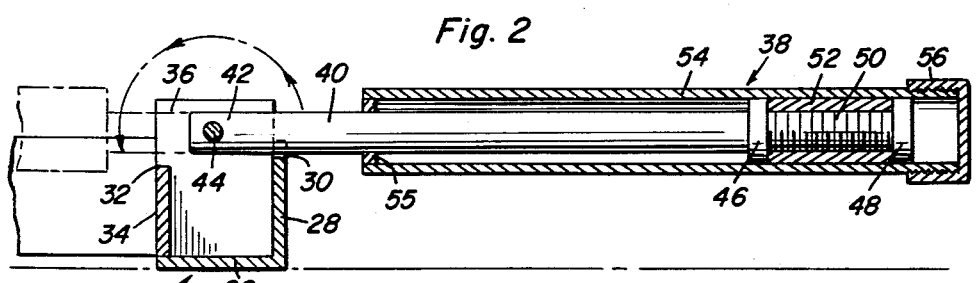
FIGURE 2 is a view on an enlarged scale with parts in section and elevation.
Figure 3:
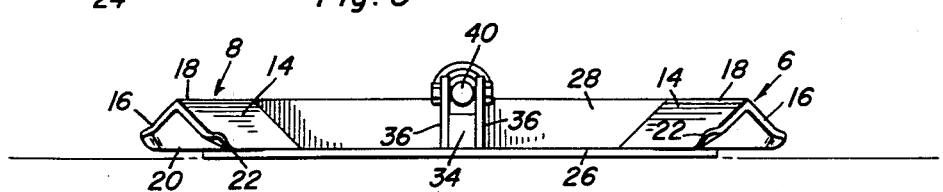
FIGURE 3 is a view on a scale larger than that followed in FIGURE 1 and which discloses what the construction looks like when observing FIGURE 1 in a direction from left to right.

The views of the drawing show that the chock comprises a simple mechanical manually usable tool or implement the major part or portion of which is U-shaped in plan and might therefore well be construed as a yoke the arms of which straddle the periphery or tread of the tire at circumferentially spaced points. More particularly this yoke comprises a pair of duplicate left and right (FIG. 1) abutments 6 and 8. These abutments are made of rigid non-corrodible metal which is sturdy but light in weight. The leading ends of the abutments are designated at 10 and the trailing ends at 12. Each abutment comprises a pair of sloping or downwardly and outwardly slanting flanges, the inner flanges 14 being in contact with the tread portions of the tire and the outward flanges being denoted at 16. The flanges join with the lengthwise vertex or ridge 18. The lower ground contacting edges, which may be described as runners, are denoted at 20. The corners of the leading ends have outwardly flared tips or terminals 22 which facilitate positioning the abutments. The trailing ends are rigidly joined together by way of an intervening connector which, more specifically, comprises an angle iron 24. The horizontal flange is denoted at 26 and the vertical flange at 28, said vertical flange closing the otherwise open ends 12 and being welded or otherwise secured thereto. The median portion of the flange 28 has a seating notch or kerf 30 therein. This kerf is in line with a rest 32 which is provided at the upper end of the insert 34 which fits between a pair of spaced parallel upstanding handle-accommodating and attaching ears or lugs 36. The upper ends of the ears project above the level of the upper edge of the flange 28. This construction serves to accommodate the extensible and projectible self-contained hammer-type handle 38. This handle comprises a rod 40 having one end portion 42 hinged or pivoted at 44 between the upper ends of the ears, the other end of the rod being provided with a shoulder-forming flange 46 and a spaced shoulder-forming head 48, the intervening portion being screw-threaded at 50 to accommodate a screw-threaded sleeve or bushing 52. This construction provides a satisfactory guide and rigidifying head for the telescoping sleeve 54. The sleeve has one end closed at 55 by a washer which slides on the rod. The other end is screw-threaded to accommodate a screw cap 56 which provides an impact head. It is obvious that the sleeve can be telescoped in and out or slid as shown in full and phantom lines in FIG. 1 and the palm of the hand of the user may be employed to drive the abutments into position in the manner illustrated in FIG. 1.

Figures 4, 5:
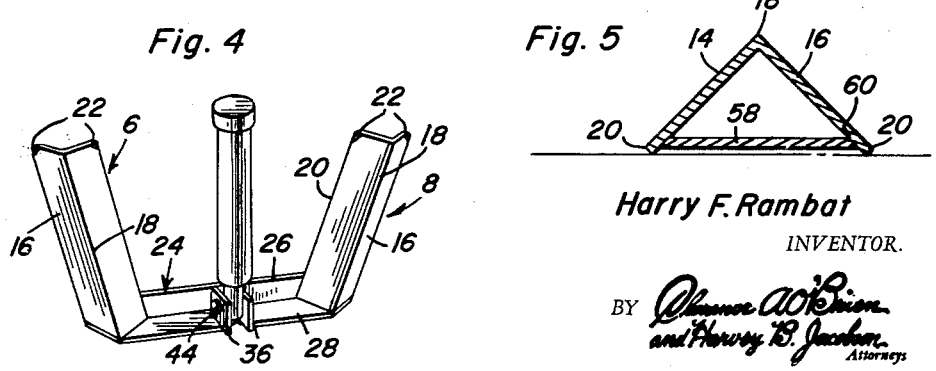
FIGURE 4 is a perspective view which not only shows the construction and arrangement of component parts but illustrates the adjustable impact handle in its collapsed ready-to-store form.
FIGURE 5 is an enlarged detail cross-section through one of the abutments and which includes a modification in construction.

It is to be pointed out that the herein disclosed and described hinged-handle chock has been actually constructed and successfully used. The devices in use weigh approximately ten pounds. The telescoping or extensible and contractible handle means weighs two pounds and serves as an impact or "hammering" member which when properly handled enables one to wedge the abutments tightly under the circumferentially spaced tread portions of the wheels. The handle also has the same desirable function in extracting the abutments in that it may be alternately yanked so that the washer 54 engages the flange or shoulder 46 to provide the desired alternating stroke action. The fact that the construction may be folded up as shown in FIG. 4 is desirable in that it then provides a convenient and compact tool which may be readily stored in a nominal space in the trunk of the automobile. It will be obvious that although the rod 40 is shown as circular in cross-section and the sleeve likewise circular, these component parts may be of some other cross-section such as, for example, square, triangular or otherwise non-circular (not shown). It is also within the purview of the invention to rigidly apply the spacing and filler member on the rod by utilizing a one-piece rod construction. Then, too the cap 56 need not be threaded for obviously it can be made an integral part of the sleeve. Furthermore, it is within the scope of the invention to add a web or plate 58 in the manner shown in FIG. 5 this being a modification and the edges of the plate being welded or otherwise secured in place at 60 and spaced above the bottoming edges 20. The same reference characters are used in this figure as employed in the other figures except for the web 58.

It is believed that a careful consideration of the specification in conjunction with the views of the drawing will enable the reader to obtain a clear and comprehensive understanding of the construction, mode of use, and features and advantages of the invention. Therefore, a more extensive description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel chock comprising a pair of coplanar abutments having opposed inwardly disposed and downwardly sloping surfaces, said surfaces being adapted and designed to bear against circumferentially spaced portions of the peripheral tread of a wheel when the wheel is situated between the respective abutments in a manner to be chocked and consequently retained in a predetermined given position, connecting means for corresponding outwardly disposed end portions of said abutments, said connecting means comprising a horizontal angle iron having interconnected vertical and horizontal flanges, said angle iron being affixed at its respective end portions to the aforementioned corresponding ends of said abutments and rigidly joining the abutments to each other, median portions of said flanges being provided with integrally joined rigid spaced-apart ears, and handle means, said handle means being longitudinally extensible and contractible and comprising telescoping cooperatively associated inner and outer component parts providing a manually usable hammer, said hammer functioning to enable the user thereof to hammer the interconnected abutments into chocking position relative to the tread of said wheel, the inner one of said component parts being positioned between and hingedly joined to said ears.

2. A wheel chock comprising, in combination, a pair of opposed coplanar correspondingly constructed ground-engaging abutments, each abutment being V-shaped in cross-section and providing opposed parallel downwardly sloping flanges adapted to contact the tread portions of a tire which is seated therebetween, the lower lengthwise edges of the respective flanges of the respective abutments constituting paired ground-engaging runners which facilitate positioning the abutments, the inward corner portions of the pairs of flanges of the respective abutments being bent and flared away from each other to facilitate piloting the respective runners into place, a horizontal web positioned between the pairs of flanges of the respective abutments, the respective webs being in a common plane but in a plane above the plane of the ground contacting surface of the aforementioned runners, the outwardly disposed trailing end portions of said abutments being rigidly connected to horizontal and vertical flanges of an angle iron which is interposed between the abutments, said angle iron and said abutments conjointly defining a generally U-shaped one-piece chock, the median portion of said angle iron being provided with a pair of spaced parallel anchoring ears fixed to the respective horizontal and vertical flanges of the angle iron and having upper ends extending to a position above the uppermost edge of the vertical flange of the angle iron, and handle means comprising inner and outer telescoping component parts, the inner one of said parts being hingedly mounted between said ears, the outer one of said parts being slidable on said inner part and having an impact head at an outer end thereof.

References Cited in the file of this patent

UNITED STATES PATENTS

| 2,641,012 | Storrs | June 9, 1953 |
| 2,858,906 | Minick | Nov. 4, 1958 |
| 2,958,143 | Bonic | Nov. 1, 1960 |

FOREIGN PATENTS

| 534,293 | Canada | Dec. 11, 1956 |

OTHER REFERENCES

Tires—Tba Merchandising, 386 Fourth Ave., New York, N.Y., November 1956, page 57.